United States Patent
Zaklad et al.

[11] 3,898,465
[45] Aug. 5, 1975

[54] IMAGING TRANSDUCER FOR RADIATION PARTICLES

[76] Inventors: Haim Zaklad, Berkeley; Steven E. Derenzo, El Cerrito; Richard A. Muller, Berkeley; Robert George Smits, Lafayette, all of Calif., granted to U.S. Energy Research and Development Administration under the provisions of 42 U.S.C. 2182

[22] Filed: Mar. 5, 1973

[21] Appl. No.: 337,974

[52] U.S. Cl................................. 250/389; 250/385
[51] Int. Cl.............................................. G01t 1/18
[58] Field of Search .......... 250/335, 374, 375, 385, 250/388, 389

[56] References Cited
UNITED STATES PATENTS
3,659,105  4/1972  Alvarez et al...................... 250/389

*Primary Examiner*—James W. Lawrence
*Assistant Examiner*—Davis L. Willis
*Attorney, Agent, or Firm*—Townsend and Townsend

[57] ABSTRACT

A radiation imaging transducer employs liquid xenon to transduce radiation such as X-rays, gamma rays or neutrons and image them. Typically, an anode-cathode system is immersed in a liquified or solidified noble gas, preferably liquid xenon. A useful fraction of these particles interact with the said liquid xenon, producing free charge called ionization. The position and amount of ionization is determined by using the electrons collected at the anode and the charge induced at the cathode. Electronic apparatus displays the position of each interaction to produce an image. In the immersed anode-cathode system, two detection planes are used to provide two orthogonally disposed coordinates with respect to the line-of-sight between the radiation emitting particle source and transducer. In one preferred embodiment, the immersed anode-cathode system operates as an ionization detector (employing a grid with no electron multiplication occurring) to provide improved energy resolution.

12 Claims, 2 Drawing Figures

IMAGING TRANSDUCER FOR RADIATION PARTICLES

BACKGROUND OF THE INVENTION

At present, the most common medical gamma camera is based on conversion of gamma rays into light using sodium iodide crystal. The spatial resolution is ≈ 10 mm at 140 kV and ≈ 1×10$^5$ count/sec highest average speed. See H. O. Anger U.S. Pat. No. 3,011,057 issued Nov. 28, 1961, entitled "Radiation Imaging Device." Another approach to imaging known in the art uses gas as the detection medium. Such approach is useful only at the lower energies of gamma rays. Our invention tends to improve the image quality so that either smaller lesions can be seen or more detailed dynamical studies can be made than presently possible.

Other radiation transducing devices within the state of the art include chambers such as that device shown in Alvarez et al. U.S. Pat. No. 3,659,105 issued Apr. 25, 1972 entitled "Subatomic Particle Detector with Liquid Electron Multiplication Medium." This detector, utilizing a liquified noble gas, makes no provision for detecting an image on a two coordinate basis within the detector.

SUMMARY OF THE INVENTION

A camera is disclosed which produces an image of radiation distribution due to external sources of radiation. The camera includes a collimator between a radioisotope emitting source, and the transducer of this invention.

The transducer consists of a liquid or solid noble gas having high electron mobility, preferably xenon or another noble gas of high density and atomic weight. The liquid or solidified noble gas has immersed within it a cathode-anode matrix. The cathode is disposed substantially orthogonally with respect to the anode, and the collimator line of sight from the source. Separation of the cathode and the anode is normally in the range of 1.0 cm to 5.0 cm to obtain good conversion efficiency.

An image is transduced between the anode and the cathode by operating the chamber either to detect electron multiplication or to detect ionization electrons.

In the electron multiplication detection mode, one coordinate is obtained by using the charge induced at one electrode array and the remaining coordinate obtained by using the charge induced at the other electrode array. In the electron multiplication mode of detection, the anode may be provided with a surrounding gaseous layer of the noble gas to promote electron multiplication in the gas region.

In the detection of ionization electrons, the radiation converts into electrons that drift past a grid into the detection region. In this embodiment, one coordinate of the required two coordinates is generated by collecting the charge induced at a grid wire. The remaining coordinate is generated by a charge generated at one of the anode strips.

An advantage of this invention is that it can utilize the capability of liquid or solidified xenon to transduce radiation into electron charge or flow. Typically, liquified xenon has high density and more important, high atomic weight or number which results in improved capacity to transduce impacting radiation into detectable electric charge or electron flow.

A further advantage of this invention is that it is particularly useful in medical applications. Incoming gamma rays in the range of 10 to 1,000 KeV, and more specifically in the range of 50 to 500 KeV, can be transduced.

Still another advantage of this invention is that it can utilize the high probability of generating a photo peak in liquid xenon due to gamma radiation in the 300 KeV range. This photo peak is narrow; good energy resolution results. When this narrow photo peak is utilized, good discrimination against scattered radiation can occur.

A further object of this invention is to dispose a two electrode array for two coordinate imaged detection.

An additional object of this invention is to disclose an improved system and process for maintaining high purity of the xenon.

An electrode having high field enhancement with respect to another electrode is placed inside the liquid. When a relatively high negative voltage is applied to the structure having high field enhancement, electrons flow from its surface into the liquid. The electrons attach to electronegative impurities and cause them to drift in the liquid toward the more positive electrode.

Typically, when the transducer is not in operation making images, the two electrodes have their polarity reversed, resulting in an electron current flowing in the liquid. The electrons attach to impurities in the liquid. These impurities become negative and migrate to the positive electrode, resulting in improved transducer performance.

Description of the Figures

Further objects, features and advantages of this invention will be understood upon referring to the following description and attached figures in which.

DESCRIPTION OF THE PREFERRED EMBODIMENTS

Figure 1:
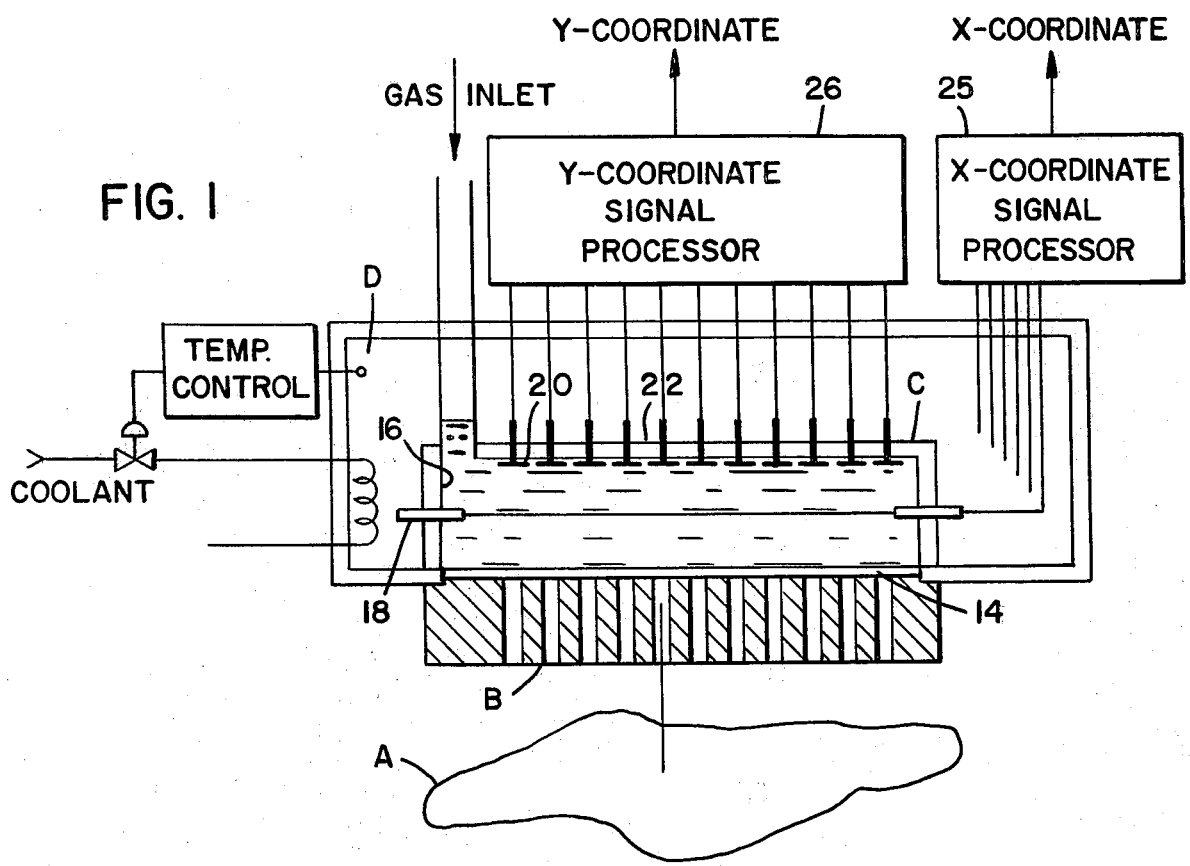
FIG. 1 is a schematic of this invention illustrating a anode-cathode electron multiplication type of transducer; and, FIG. 2 is a perspective view of a transducer of this invention arrayed as an ionization electron detector.

Referring to FIG. 1, a source A emitting radiation sends radiation through a collimator B to the image transducer C of his invention. Typically, the image transducer C is in a dewar containing a bath D of fluorinated hydrocarbons.

Source or target A must emit radiation, perferably gamma rays. Imaging of the target A is conventional, either by emission directly from the target of radiation or alternately by illuminating the target with radiation from another source.

Collimator B defines the line of sight between the target A and the transducer C. It functions to block other than substantially parallel impact of radiation between the target and transducer.

The dewar mounting of the transducer C in a bath D is conventional. Typically, the transducer C operates with liquified xenon at a temperature of −107° C with the pressure of one atmosphere. Temperature tolerance in the chamber is maintained plus or minus 2° C. To maintain the chamber at its desired temperature, bath D is typically a commercial refrigerant; fluorinated hydrocarbons with selected thermal properties are preferred.

Between the collimator B and the transducer C, a window 14 is located. Typically, this window consists of stainless steel in the range of 1/200 inch thick.

Mounted about the window 14 is a chamber 16. One anode of an array of anodes 18 is shown passing across between the side walls of the chamber 16. Anodes 18 are typically normal to the line of sight defined by collimator B between source A and the transducer C. Typically, anodes 18 are made of tungsten wire, 3 to 5 microns in diameter. In the illustration of FIG. 1, the nearest anode wire 18 is visible disposed between the side walls of chamber 16. The anodes 18 typically correspond in numbers to the cathode strips 20 and are disposed in parallel side-by-side relation.

Cathode strips 20, like anode wires 18, extend in parallel side-by-side relation across chamber 16. Whereas anode wires 18 are located medially between the chamber wall 22 and window 14, cathode strips 20 are placed adjacent chamber wall 22. The cathode strip can be made by depositing conductors on an alumina substrate.

As hereinshown, cathode strips 20 are orthogonally disposed with respect to anode wires 18 and the line of sight defined by collimator B.

High voltage is applied between the anode and the cathode, typically 3 to 9 kV, such that the anode is more positive than the cathode.

Electron multiplication in the liquid — typically xenon — occurring near the anode wires 18, is detected by suitable X coordinate signal processor 25. Likewise, charge induced by electron flow near anode 18 is detected by Y coordinate signal processor 26. As is conventional, the resolved X and Y coordinates are imaged at suitable display equipment such as a cathode ray tube, not shown.

In operation, a radiation such as a gamma ray enters through collimator B to the interior of the transducer C. Typically, impact with one or more of the liquid xenon atoms occurs. When impact occurs, the radiation releases free electrons which migrate under the electric fields to the vicinity of anode wire 18. These electrons undergo multiplication at anode wire 18 and are collected, as described in a prior art.

This electron flow and multiplication induce a charge at an overlying cathode strip 20. This charge is additionally detected. When the respective X coordinates from the anode 18 and Y coordinates from the cathode strip 20 are transduced and displayed, imaging of target A results.

It may be desired to enhance electron multiplication in the vicinity of anode wire 18. This can be done by placing anode wire 18 in gaseous xenon above the solid-gas interface of xenon within chamber 16. Alternately, anode wire 18, though immersed in liquid xenon, may be heated by passing electron current through it, in which case there will be generated a gaseous layer between the liquified noble gas and anode wire 18. Enhanced electron multiplication will occur within the gas between the liquified noble gas and the anode wire. Likewise, liquid xenon can be solidified to provide a solid-gaseous interface for electron multiplication in the gas.

Figure 2:
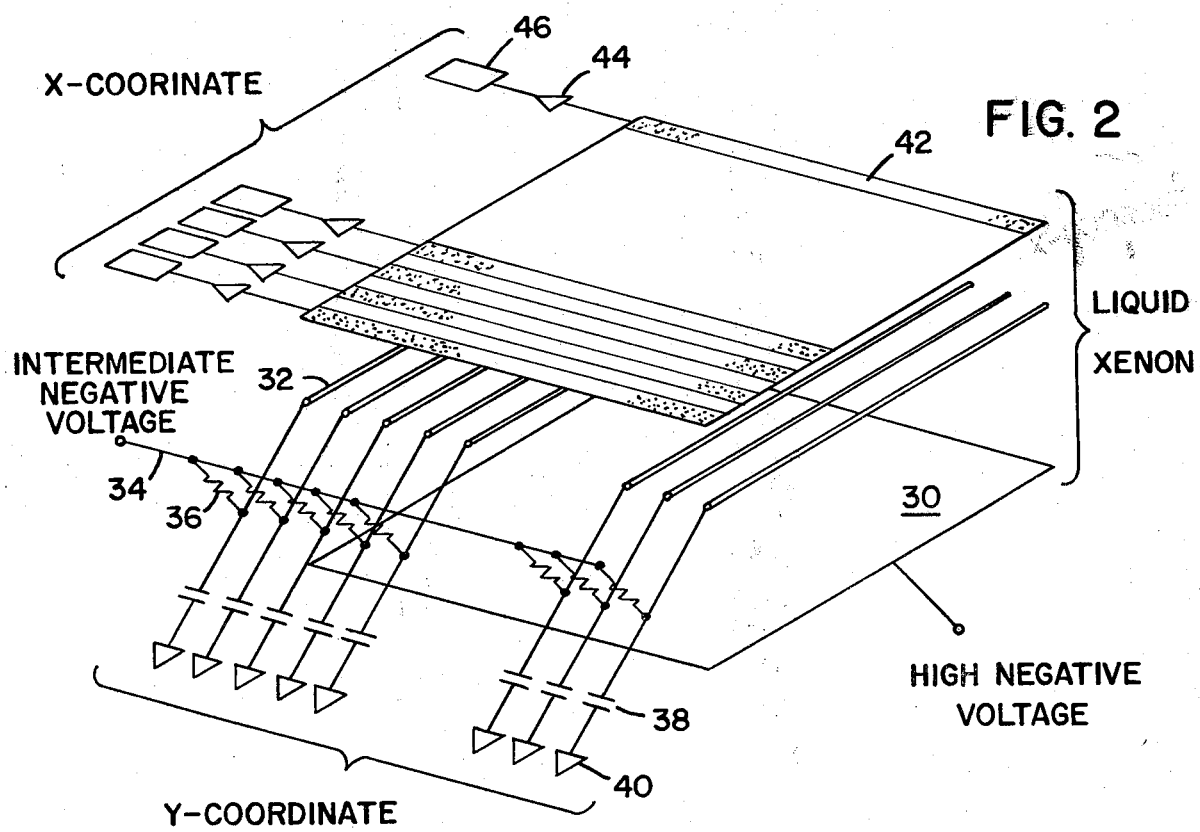

Referring to FIG. 2, a transducer of this invention arrayed as an ionization electron detector is illustrated. Typically, a cathode plane 30, which can constitute the window 14 of a chamber such as chamber 16 in FIG. 1, is disposed between the source on one hand, and the interior of the transducer on the other hand. Overlying plane 30 there is an array of side-by-side parallel wires 32 (which can be a Frisch grid). Wires 32 are maintained at at intermediate negative voltage, this voltage being supplied through conductors 34 through high impedance resistors 36. As is illustrated, each wire 32 is connected via capacitors 38 to amplifiers 40.

Overlying both cathode plane 30 and wires 32 (which are typically a Frisch grid) are a series of anode strips 42. Anode strips 42 are typically disposed in a plane. Each of these strips 42 are connected to anode amplifiers 44 and to pulse height discriminators 46. Usually, the anode strips 42 cross wires 32 so as to provide two coordinate resolution.

Anode strips 42 are typically maintained at nearly ground potential. Cathode plane 30 is maintained at a relatively high negative potential. Wires 32 interstitially placed between the negative cathode plane 30 and the anode strips 42 are maintained at an intermediate relatively negative voltage potential to minimize interference with migrating electrons.

In operation, radiation (typically gamma rays) is emitted by the source A and passes through the relatively negative cathode 30. The radiation then collides and ionizes molecules of the liquid or solidified xenon. Free electrons are liberated.

The free electrons then migrate in the liquid xenon toward anode strips 42.

Typically, the electrons will migrate past wires 32. In migrating from wires 32 to anode strips 42, they will induce a changing electron charge on wires 32 which will pass through the respective capacitors 38 to amplifiers 40 for resultant display at conventional display apparatus. During this migration, a charge will also be induced on anode strips 42, amplified at amplifiers 44 and subjected to pulse height discrimination at pulse height discriminators 46. Only pulses that pass the pulse height discriminator are accepted for a display at the dual coordinates at the display apparatus.

The grid composed of wires 32 intermediate the relatively negative charged cathode 30 on one hand, and the anode strips 42 on the other hand, has an advantage not immediately apparent. Typically, electron ionization will occur in the spatial interval between the negatively charged cathode 30 and the grid 32. Some ionizations will occur at distances relatively remote from grid 32. Other ionizations will occur at distances relatively close to grid 32. It has been found that in the absence of the grid, the signal detected at the anode 42 will be a function of the distance between the conversion point and the nearest anode strip 42. This distance of impact is a matter of chance and does not relate to the image of target A.

Grid 32 functions to shield anode strips 42 so that charge is induced on anode strips 42 during the time when the electrons are migrating between cathode 30 and grid 32. All electrons originating from the region between cathode 30 and grid 32 will thus induce a substantially uniform charge on anode strips 42. So long as the radiation is totally converted to free electrons, the conversion energy will typically pass through pulse height discriminators 46. Detection of an image with energy discrimination will result.

A gamma ray entering the transducer may interact with the liquid more than once, distributing its ionization over a large area. Under such conditions, the charge may be deposited over more than one anode line. Pulse height discriminators applied to each line individually can reject such multiple event and enhance image resolution.

It is known in the art that one transducer can operate in conjunction with another to detect colinear gamma rays emitted from a positron emitting radioisotope. It is desired that the transducers be able to detect the two gamma rays with a timing accuracy of a microsecond or less in order to limit the rate of accidental coincidences. The timing accuracy available when detecting the ionization alone is limited by the migration time of the electrons coupled with variations in the distance between the point of interaction and the charge-sensing electrodes.

This accuracy can be improved by simultaneously detecting the scintillation light produced in the interaction with a suitable photoelectric device, such as a photomultiplier. This light travels approximately 100,000 times faster than the electrons and can be used to provide coincidence information that is very useful in discriminating against accidental coincidences.

It should be relaized that the two transducers herein illustrated can be altered in their array, charge, and location to produce transducers of the invention herein. Moreover, the noble gases can be either liquified or solidified with both the liquid or the solid having a gaseous interface. Likewise, other modifications can be made without departing from the spirit and scope of this invention.

We claim:

1. A radiation imaging transducer for imaging said radiation directed along a preselected path from a target, said transducer comprising a chamber including means for confining noble gas in other than a gaseous state; a window formed from one of the walls of said chamber for permitting radiation exterior of the chamber to enter into the interior of said chamber along said preselected path; a noble gas within said chamber having a portion thereof in other than a gaseous state; means connected to said chamber to maintain said portion of said noble gas in other than a gaseous state; first and second electrode arrays disposed substantially normal to the path of said incoming radiation with said portion of said noble gas between said electrodes; and, means for maintaining a voltage potential to promote electron flow from the direction of one of said electrode arrays and means for detecting said electron migration connected to at least one of said electrode arrays.

2. The invention of claim 1 and wherein means for detecting electron migration are connected to both said electrode arrays for detecting electron migration.

3. The invention of claim 1 and wherein said portion of said noble gas is in a liquid state.

4. The invention of claim 1 and wherein said portion of said noble gas is in a solid state.

5. The invention of claim 1 and wherein said transducer includes a plate; said plate disposed between said electrode arrays and said target within said portion of said noble gas, and means for applying a voltage to said plate to promote electron migration between said plate and said electrode arrays.

6. The invention of claim 1 including means for reversing said voltage potential at one of said electrodes to cause electrons to flow from its surface into said confined noble gas in other than a gaseous state, causing said electrons to attach to electro-negative impurities and cause said impurities to drift in said noble gas toward one of said first and second electrodes having a more positive charge.

7. The improvement in a camera combination comprising an imaging transducer; a target; radiation emitted from the direction of said target to image said target and means intermediate said transducer and target for focusing said radiation to an image at said transducer; the improvement in said transducer comprising a chamber including means for confining a noble gas in other than a gaseous state; a window formed from one of the walls of said chamber for permitting radiation exterior of the chamber to enter into the interior of said chamber along said preselected path; a noble gas within said chamber having a portion thereof in other than gaseous state; means connected to said chamber to maintain said portion of said noble gas in other than a gaseous state; first and second electrode arrays disposed substantially normal to the path of said incoming radiation with said portion of said noble gas between said electrodes; and means for maintaining a voltage potential to promote electron flow from the direction of one of said electrode arrays to the other of said electrode arrays and means for detecting said electron migration connected to at least one of said electrode arrays.

8. The invention of claim 7 and wherein means for detecting electron migration are connected to both said electrode arrays for detecting electron migration.

9. The invention of claim 7 and wherein said noble gas is Xenon.

10. The invention of claim 7 and wherein said portion of said noble gas surrounds one of said electrodes.

11. The invention of claim 7 and wherein said means for detecting includes a pulse height discriminator means connected to at least one of said electrode arrays.

12. In combination a target, radiation applied to said target for emanating from said target radiation to image said target; an imaging transducer at a preselected location from said target; means between said target and said imaging transducer for focusing radiation emanating from said target at said imaging transducer along a preselected path; said radiation imaging transducer for imaging said radiation directed along said preselected path from a target, said transducer comprising a chamber including means for confining a noble gas in other than a gaseous state; a window formed from one of the walls of said chamber for permitting radiation exterior of the chamber to enter into the interior of said chamber along said preselected path; a noble gas within said chamber having a portion thereof in other than a gaseous state; means connected to said chamber to maintain said portion of said noble gas in other than a gaseous state; first and second electrode arrays disposed substantially normal to the path of said incoming radiation with said portion of said noble gas between said electrode arrays; and means for maintaining a voltage potential to promote electron flow from the direction of one of said electrode arrays to the other of said electrode arrays and means connected to at least one of said electrode arrays for detecting said electron migration.

\* \* \* \* \*